(12) United States Patent
Okamura et al.

(10) Patent No.: US 11,195,493 B2
(45) Date of Patent: Dec. 7, 2021

(54) COMPENSATION DRIVING FOR LONG HORIZONTAL BLANK

(71) Applicant: Synaptics Incorporated, San Jose, CA (US)

(72) Inventors: Kazuhiro Okamura, Tokyo (JP); Atsushi Maruyama, Tokyo (JP); Daisuke Ito, Tokyo (JP); Takashi Nose, Tokyo (JP); Hirobumi Furihata, Tokyo (JP)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 16/871,979

(22) Filed: May 11, 2020

(65) Prior Publication Data

US 2021/0350763 A1  Nov. 11, 2021

(51) Int. Cl.
*G09G 5/10* (2006.01)
*G09G 3/20* (2006.01)
*G06F 3/041* (2006.01)

(52) U.S. Cl.
CPC ............ *G09G 5/10* (2013.01); *G06F 3/0412* (2013.01); *G09G 3/2007* (2013.01); *G06F 3/04184* (2019.05); *G09G 2310/0264* (2013.01); *G09G 2310/0267* (2013.01); *G09G 2310/08* (2013.01); *G09G 2320/0233* (2013.01); *G09G 2320/0271* (2013.01); *G09G 2320/041* (2013.01); *G09G 2320/0673* (2013.01)

(58) Field of Classification Search
CPC ............... G06F 3/0412; G06F 3/04166; G06F 3/04184; G09G 3/3677; G09G 3/3648; G09G 3/3255; G09G 5/10; G09G 2310/0297; G09G 2310/08; G09G 2320/0233; G09G 3/2007; G09G 2310/0264
See application file for complete search history.

(56) References Cited

U.S. PATENT DOCUMENTS

2008/0303767 A1   12/2008   Ludden et al.
2013/0057512 A1   3/2013    Lillie et al.
(Continued)

FOREIGN PATENT DOCUMENTS

KR    10-0758295 B1      9/2007
KR    10-20190027674 A   3/2019

OTHER PUBLICATIONS

Written Opinion of the International Searching Authority issued in corresponding international application No. PCT/US2021/029377 dated Aug. 11, 2021 (4 pages).
(Continued)

*Primary Examiner* — Xuemei Zheng
(74) *Attorney, Agent, or Firm* — Ferguson Braswell Fraser Kubasta PC

(57) ABSTRACT

One or more embodiments are directed to compensating for a long horizontal blank (LHB) period. Using a first display data value, a compensation amount is determined from a mapping between display data and compensation amounts. The first display data value is for a display row after an LHB period in a display frame of a display panel. A second display data value is adjusted with the compensation amount to obtain revised display data value. The revised display data value is outputted for the display panel.

20 Claims, 15 Drawing Sheets

(56) References Cited

U.S. PATENT DOCUMENTS

| | | | |
|---|---|---|---|
| 2014/0049507 A1* | 2/2014 | Shepelev | G06F 3/04184 345/174 |
| 2015/0268777 A1* | 9/2015 | Okamura | G06F 3/0446 345/205 |
| 2016/0259478 A1 | 9/2016 | Wang et al. | |
| 2018/0033391 A1* | 2/2018 | So | G09G 3/20 |

OTHER PUBLICATIONS

International Search Report issued in corresponding international application No. PCT/US2021/029377 dated Aug. 11, 2021 (4 pages).

\* cited by examiner

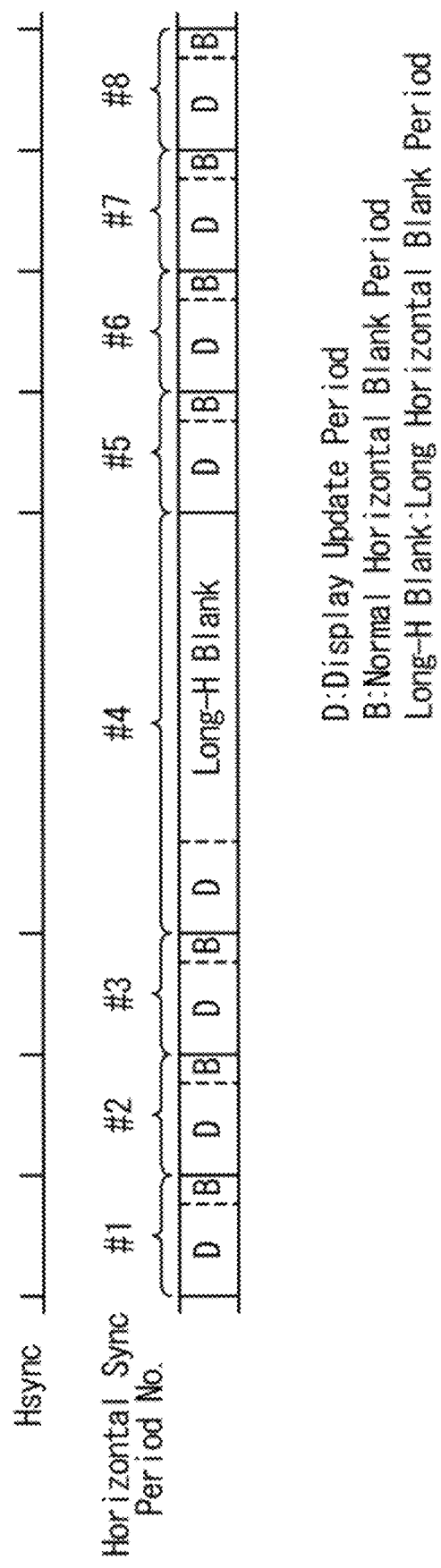
FIG. 1.1

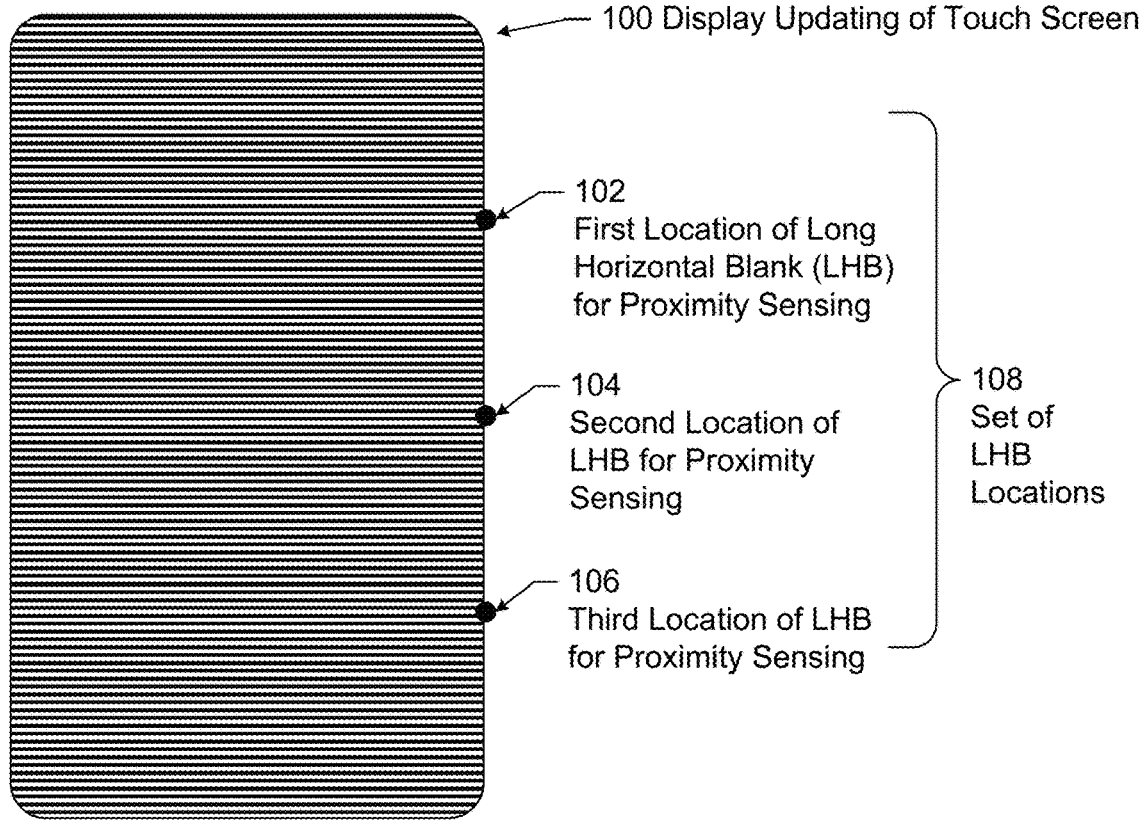
FIG. 1.2
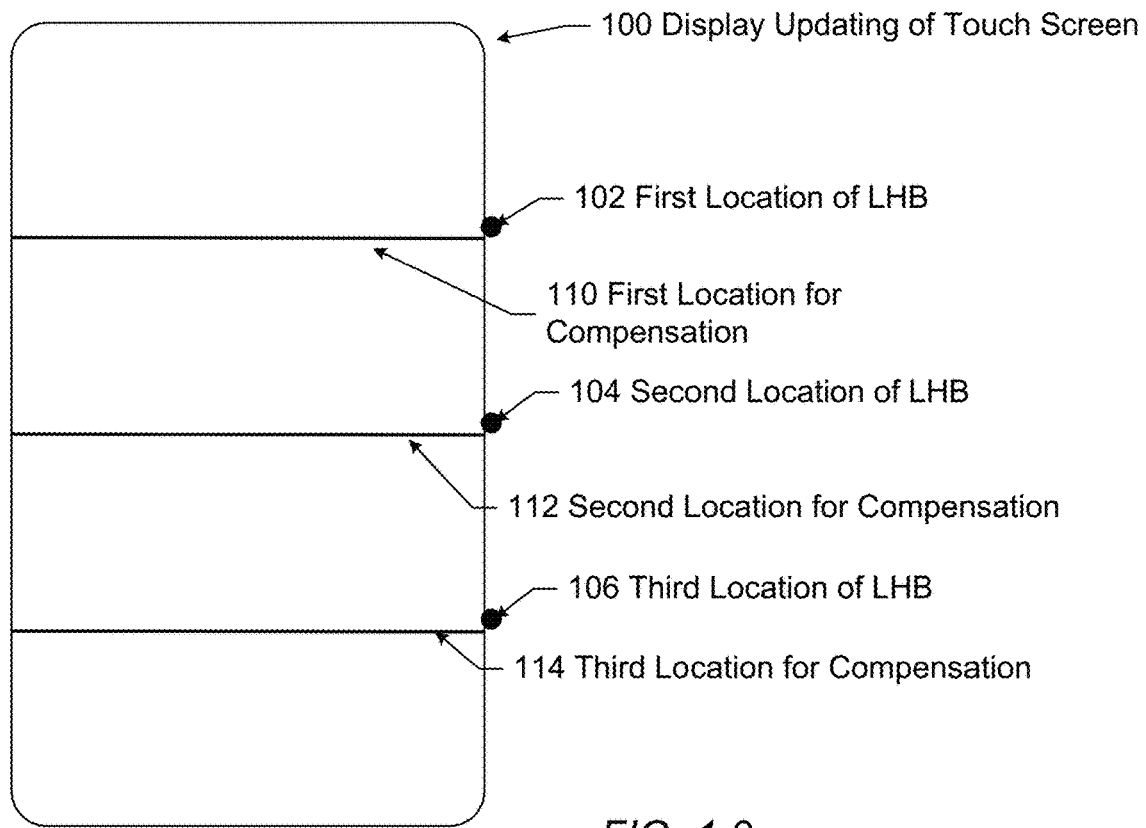
FIG. 1.3

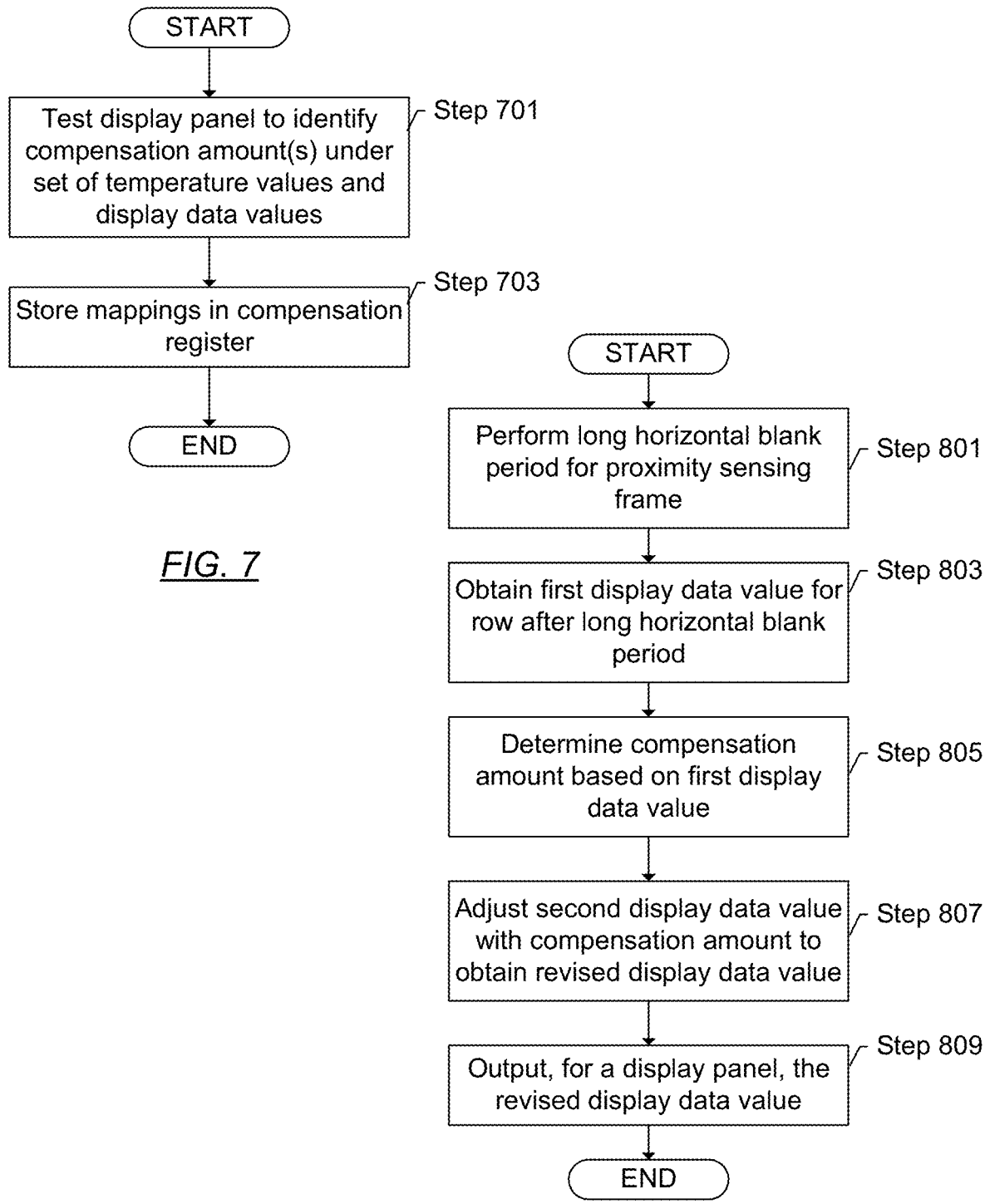

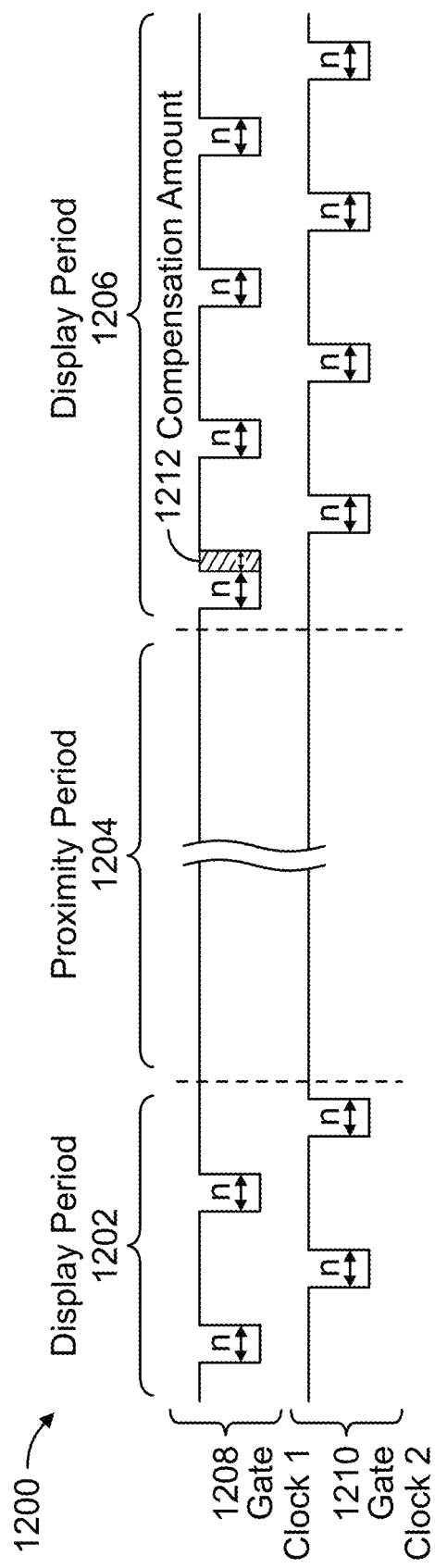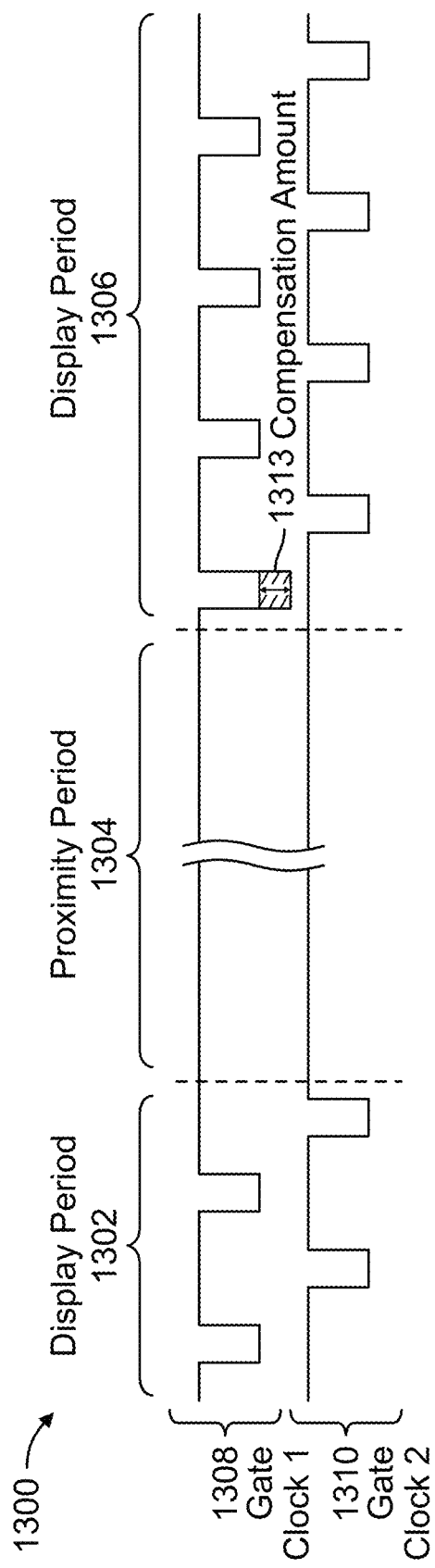

| Register name | Register value | Compensation amount |
|---|---|---|
| Coefficient_L1 | 255 | C * 255/255 |
| Coefficient_L2 | 0 | 0 |
| Coefficient_L3 | 0 | 0 |
| Coefficient_L4 | 0 | 0 |
| Coefficient_L5 | 0 | 0 |
| ⋮ | ⋮ | ⋮ |
| Coefficient_Ln | 0 | 0 |
*FIG. 15.1*
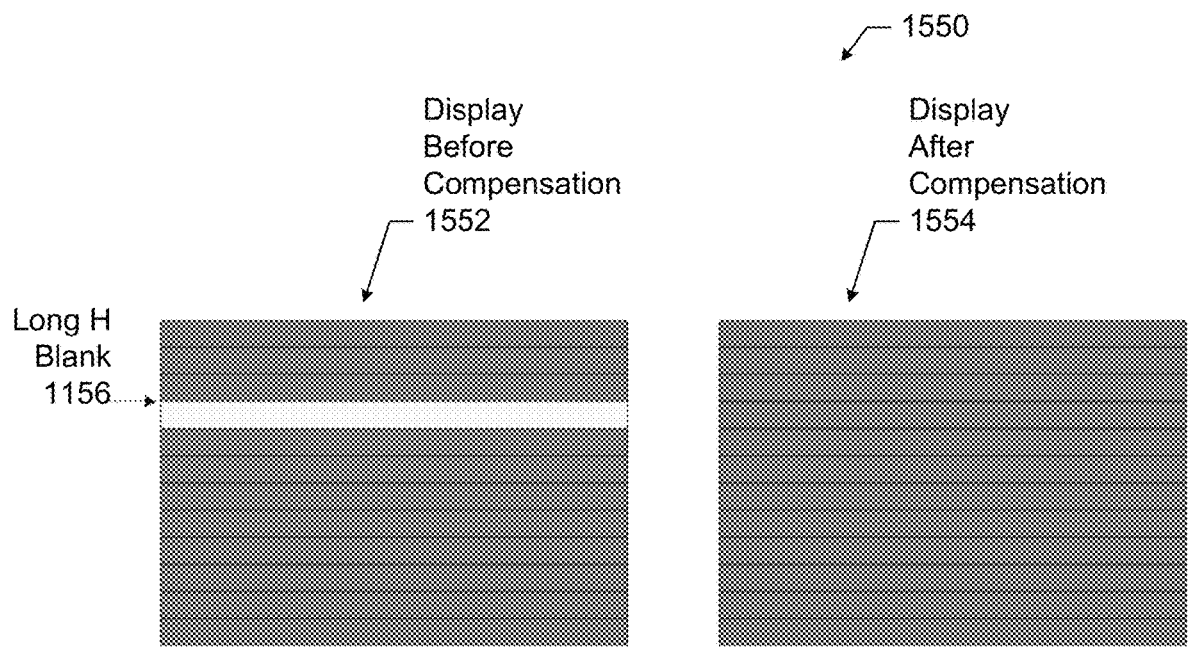
*FIG. 15.2*

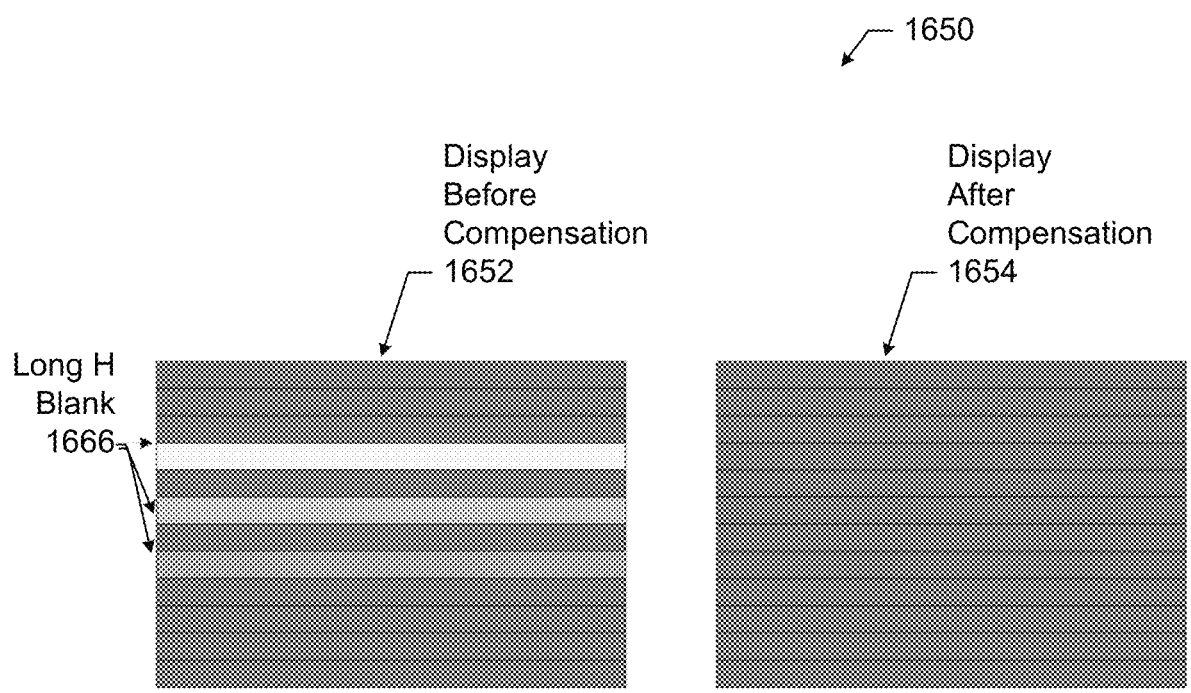
FIG. 16.1
FIG. 16.2

COMPENSATION DRIVING FOR LONG HORIZONTAL BLANK

FIELD

The present disclosure generally relates to touchscreen devices, and, in particular, the display frame updating of such devices.

BACKGROUND

Touchscreens are display devices that allow users to interact with a computing device by being proximate to, including touching, the display screen. As such, touchscreens involve two operations, display updating and proximity sensing. Display updating is performed for a display frame by a display driver updating row by row of pixels of the display screen. At the end of updating each row is a horizontal blank period, which is a pause in the display updating. At the end of the display frame, a vertical blank period exists. During the blank periods, the display is not updated.

Proximity sensing is the operation to detect whether, the locations, and other information about any input objects being proximate to the touchscreen. Proximity sensing may be performed, for example, by acquiring capacitive measurements using sensor electrodes located along the sensing region. The capacitive measurements include the effects of noise as well as any input object present in the sensing region. Because capacitive measurements are affected by noise as well as input objects, a higher signal to noise ratio (SNR) results in more accurate detection of input objects. One source of noise is display updating. To obtain more accurate detection, capacitive sensing is often performed when the display is not being updated, such as during a blank period.

SUMMARY

In general, in one aspect, one or more embodiments relate to a compensation circuit. The compensation circuit includes a compensation register and circuitry. The compensation register stores a mapping between display data and compensation amounts. The circuitry is configured for determining a compensation amount from the compensation register using a first display data value for a display row after a long horizontal blank period in a display frame of a display panel, adjusting a second display data value with the compensation amount to obtain revised display data value, and outputting, for a display panel, the revised display data value.

In general, in one aspect, one or more embodiments relate to a display driver that includes a compensation circuit. The compensation circuit is configured to determine, using a first display data value, a compensation amount from a mapping between display data and compensation amounts. The first display data value is for a display row after a long horizontal blank period in a display frame of a display panel. The compensation circuit is further configured to adjust a second display data value with the compensation amount to obtain revised display data value, and output for a display panel the revised display data value.

In general, in one aspect, one or more embodiments relate to a method. The method includes determining, using a first display data value, a compensation amount from a mapping between display data and compensation amounts. The first display data value is for a display row after a long horizontal blank period in a display frame of a display panel. The method further includes adjusting a second display data value with the compensation amount to obtain revised display data value, and outputting for a display panel the revised display data value.

Other aspects of the disclosure will be apparent from the following description and the appended claims.

BRIEF DESCRIPTION OF DRAWINGS

FIG. 1.1 shows a timing diagram for a portion of a display frame in accordance with one or more embodiments of the technology.

FIG. 1.2 shows an example of updating a display frame in accordance with one or more embodiments.

FIG. 1.3 shows an example of a brightness artifact during updating of a display frame in accordance with one or more embodiments.

FIG. 7 shows an example flowchart for creating mappings in a compensation register in accordance with one or more embodiments.

FIG. 8 shows a flowchart for using the compensation circuit in accordance with one or more embodiments.

FIG. 12 shows an example timing diagram for compensating for brightness artifact in accordance with one or more embodiments.

FIG. 13 shows an example timing diagram for compensating for brightness artifact in accordance with one or more embodiments.

FIG. 15.1 shows an example compensation register in accordance with one or more embodiments.

FIG. 15.2 shows an example display screen in accordance with one or more embodiments.

FIG. 16.1 shows an example compensation register in accordance with one or more embodiments.

FIG. 16.2 shows an example display screen in accordance with one or more embodiments.

DETAILED DESCRIPTION

Figure 2:
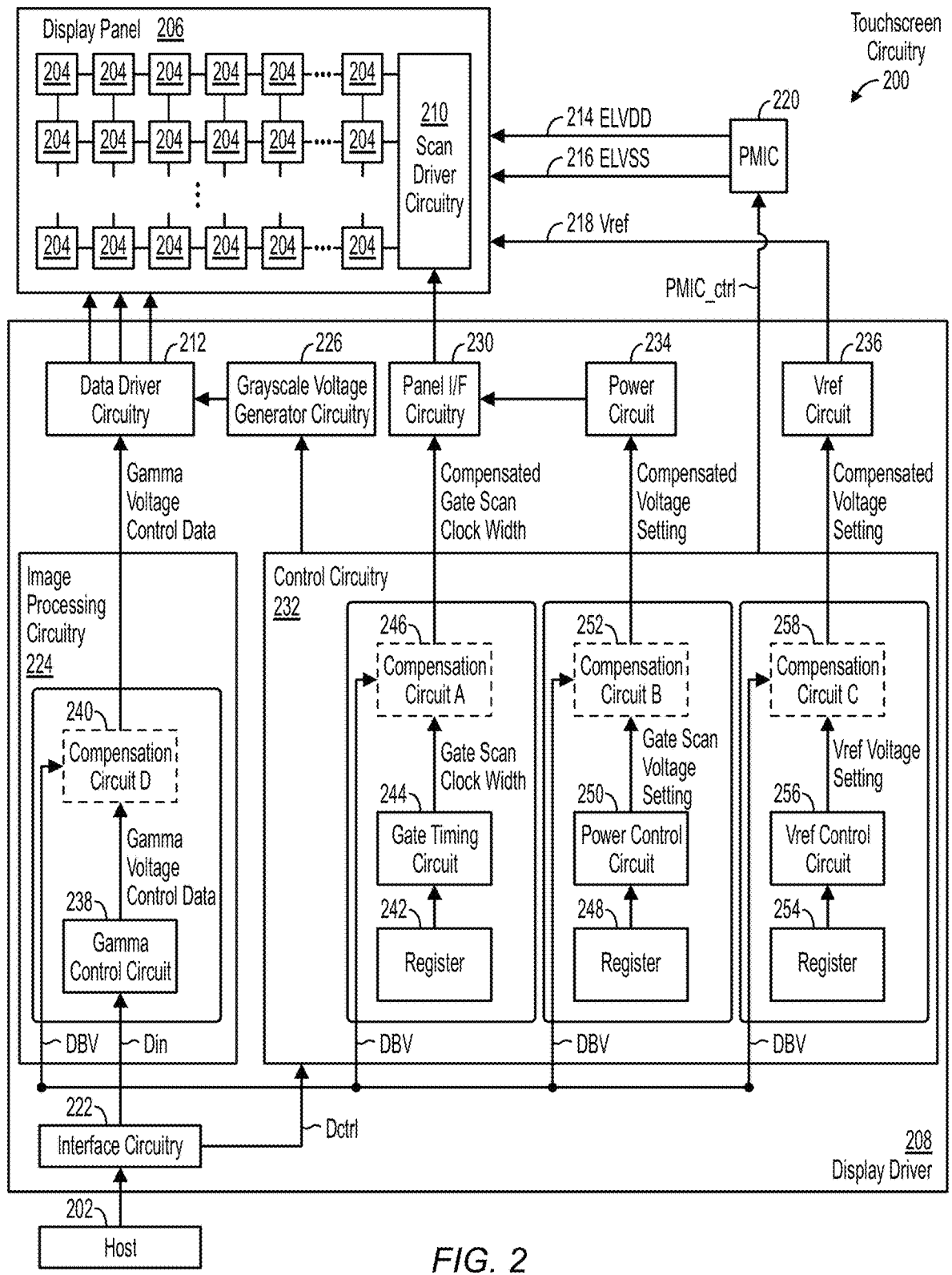
FIG. 2 shows an example circuit diagram in accordance with one or more embodiments.

Specific embodiments of the disclosure will now be described in detail with reference to the accompanying figures. Like elements in the various figures are denoted by like reference numerals for consistency.

In the following detailed description of embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before" "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Generally, embodiments of the technology are directed to touchscreens. Touchscreens include a display component (i.e., display) and a proximity sensor component. In some touchscreens, one or more components used in the display are also used in the proximity sensor component. The proximity sensor component may be or may include all or a portion of the same integrated circuit as the display component. Similarly, the display component may include all or a portion of the same integrated circuit as the display component.

In order for a touchscreen to both display information and detect input objects, two operations are performed, namely display updating and proximity sensing. Display updating may comprise driving, row by row, the display pixels of the display screen. A display frame is the update of all of the display pixels of the display screen. The display frame rate is the number of display frames per unit of time.

Proximity sensing is the operation to detect information about an input object that is proximate to the touchscreen. A proximity sensing frame, or touch frame, includes the operations to capture a state, for a single moment in time, of the sensing region with respect to an input object present. The sensing region may encompass any space above, around, in and/or near the touchscreen in which the proximity sensor electrodes are able to detect user input (e.g., provided by one or more input objects). The sizes, shapes, and locations of particular sensing regions may vary depending on actual implementation. Example input objects include fingers, styli, other body parts (e.g., palms and face), etc.

Proximity sensing may be performed, for example, by acquiring capacitive measurements using sensor electrodes located proximate to the sensing region. The capacitive measurements are affected by noise (i.e., interference) as well as any input object present in the sensing region. By removing an estimate of such noise from the capacitive measurements and performing other operations, information about input objects that are present may be determined. Display noise, or the noise due to the display frame updating the display, may be a source of noise when performing proximity sensing during display updating.

In order to have a more accurate detection through a higher signal to noise ratio (SNR), display updating may be paused during proximity sensing. Because the proximity sensing frame rate may be higher than the display frame rate, a proximity sensing frame may be performed during one or more of the horizontal blank periods. To allow sufficient time for the proximity sensing frame, the horizontal blank period used for the proximity sensing frame may be lengthened. The lengthened horizontal blank period is referred to as a long horizontal blank ("LHB") period.

When the display frame returns from an LHB period, a change in the brightness of the display pixels may occur. For example, the brightness artifact may be due to leakage of a gate scan driver circuitry or pixel circuit in the display panel. In the present disclosure, the term "brightness artifact" refers to an unintentional change in brightness or luminesce of the display screen. The brightness artifact may be brightness unevenness or other such artifact in the display image. For example, the brightness artifact may be an increase in brightness of the display screen for the one or more affected rows of display pixels.

In general, embodiments of the technology are directed to a compensation circuit configured to adjust a display data value, such as gamma voltage, gate clock width, gate clock voltage, reference voltage, etc., that is used to drive a touchscreen. The compensation circuit compensates for brightness artifact of the display screen that may occur when returning from performing proximity sensing.

Turning to the Figures, FIG. 1.1 shows a timing diagram of a portion of a display frame in accordance with one or more embodiments of the technology. As shown in FIG. 1.1, a horizontal sync signal (Hsync in FIG. 1.1) is asserted at the beginning of each horizontal sync period #1-#8, and each horizontal sync period includes a display update period D and a horizontal blank period B or LHB. As shown in FIG. 1.1, some, but not all, horizontal sync periods include an LHB period, and the remaining horizontal sync periods include a normal horizontal blank period B, where the LHB period is longer than the normal horizontal blank period. The LHB period provides a sufficient time duration for performing a proximity sensing frame. In the illustrated embodiment, horizontal sync periods #1 to #3 and #5 to #8 have a normal horizontal blank period B, and horizontal sync period #4 has an LHB period. Signal processing for proximity sensing, which may include supplying transmitter signals to sensor electrodes and receiving resulting signals from the sensor electrodes, may be performed during the LHB period.

FIG. 1.2 shows an example illustrating display updating of a touchscreen (100) for a single display frame in accordance with one or more embodiments. FIG. 1.2 illustrates an orthogonal view to the touchscreen (100) (e.g., a top down view of the touchscreen). An example of a display in a touchscreen (100) includes a liquid crystal display (LCD), an organic light emitting diode (OLED) display, and micro light emitting diode (LED) display. The size and shape of the touchscreen (100) may vary and are not limited to the size and shape shown in FIG. 1.1. For example, the touchscreens may be in a mobile device, television of any size, monitor, laptop computer, gaming device, automobile, or any other suitable device.

FIG. 1.2 shows a set of alternating light and dark rows. Each row in FIG. 1.2 corresponds to a row of pixels. The rows are enlarged and shown alternating in FIG. 1.2 for illustrative purposes only and are not indicative of information displayed. The display updating may be performed successively for each row. During the display updating of a row, each pixel in the row is driven to set the display value of the pixel. At the end of each row is a horizontal blank period. Because proximity sensing frame rate may be higher than the display frame rate, an LHB period may be disposed at the end of some of the rows.

As discussed above, during the LHB period, a proximity sensing frame is performed. During the proximity sensing frame, the state of the sensing region with respect to any input objects present is captured. Continuing with FIG. 1.2, three locations of LHB period (e.g., first location (102), second location (104), third location (106)) are present in the display frame. The locations of the LHB period in a display frame form the set of LHB locations (108) for a display frame. The locations in the set of LHB locations (108) shown in FIG. 1.2 are for example purposes only. Different implementations may have different locations and different number of locations.

Performing an LHB period may cause brightness artifact to occur for the next successive row. FIG. 1.3 shows the example touchscreen (100) of FIG. 1.2 with the same set of LHB locations (108) as shown in FIG. 1.2. The dark rows in FIG. 1.3 show the locations of brightness artifact due to the LHB periods. Although dark lines are shown, the brightness artifact may be a brighter row of pixels than the other rows. The locations for the brightness artifact may be the row or set of rows immediately succeeding the locations of the LHB periods.

One cause of the brightness artifact may be charge leakage from pixel circuits during an LHB period. In some displays, updating a pixel circuit may be performed over two or more horizontal sync periods. For example, updating a pixel circuit may include initializing the pixel circuit in a first horizontal sync period and programming the pixel circuit with a source signal in a second horizontal sync period that follows the first horizontal sync period. When the first horizontal sync period includes an LHB period, a part of electric charges accumulated by the pixel circuit initialization may be lost during the LHB period, and this may cause a change in the luminance level of the pixel circuit.

Because the loss of the electric charges occurs in a row of pixel circuits that are initialized in the first horizontal sync period, the effect of the charge leakage during the LHB period may be visually perceivable in the form of a horizontal line in the displayed image (e.g., the lines shown in FIG. 1.3). Further, in cases where a scan driver circuitry includes bootstrap circuitry to generate gate scan signals, charge leakage from the bootstrap circuitry may cause brightness unevenness or artifact in the displayed image. The bootstrap circuitry may be configured to generate a gate scan signal by using electric charges accumulated by using another gate scan signal previously generated. In such cases, charge leakage from the bootstrap circuitry may cause an insufficient amplitude of a gate scan signal, resulting in the brightness artifact. In one or more embodiments, the gate scan signals are scan signals transmitted on scan lines.

One technique for compensating for the brightness artifact is to change the set of LHB locations (108) between display frames. For example, the set of LHB locations may be the locations shown in FIG. 1.2 for a first display frame, then each LHB location may be moved three rows down for the immediate successive display frame, etc. The change in locations may continue round robin for successive display frames. As another example, the LHB locations (108) in the set of LHB locations may change randomly or semi-randomly so as not to follow a human observable pattern. By changing the set of LHB locations (108) between display frames, the brightness artifact may be less noticeable to a human.

Changing the LHB locations in the set may be combined with other techniques for compensating for the brightness artifact, for example, by using compensation circuits at the locations of brightness artifact (e.g., a first location for compensation (110), a second location for compensation (112), a third location for compensation (114)). The various techniques for compensating for the brightness artifact at the locations in the display is described below.

FIG. 2 shows an example circuit diagram for a display of a touchscreen in accordance with one or more embodiments. The touchscreen circuitry (200) may be configured to display an image corresponding to input image data received from a host (202). The host (202) may include an application processor, a central processing unit (CPU) or other processors. In embodiments, the touchscreen circuitry (200) includes a display panel (206) and a display driver (208). The display panel (206) includes the circuitry for a display of a touchscreen. Thus, whereas the display includes the set of pixels (e.g., light emitting elements that are capable of luminescence), the display panel includes the traces, transistors, and other circuitry that causes the pixels to luminesce.

In the embodiment shown, the display panel (206) includes at least a display area with pixels circuits (204) and scan driver circuitry (210). The display panel (206) may include additional components, such as a high-side power source terminal (not shown) and a low-side power source terminal (not shown). The pixel circuits (204) are connected with N scan lines SC [1] to SC [N] (not shown), N emission lines EM [1] to EM [N] (not shown), and M data lines D [1] to D [M] (not shown). For the purposes of simplifying the Figures, the lines connecting the pixel circuits (204) are shown as single dark lines. In other words, each single dark line represents one or more electrical traces, such as the scan lines, the emission lines, and the data lines. An expanded view of the pixel circuits (204) and lines is shown in FIG. 3.

Continuing with FIG. 2, the scan lines SC [1] to SC [N] and the N emission lines EM [1] to EM [N] are coupled to the scan driver circuitry (210) and the data lines D [1] to D [M] are coupled to the display driver circuitry (212). The scan lines SC [1] to SC [N] and the emission lines EM [1] to EM [N] are extended in the horizontal direction of the display panel (206), and the data lines D [1] to D [M] are extended in the vertical direction. Each pixel circuit (204) is coupled to a corresponding scan line SC, emission line EM, and data line D. The pixel circuit (204) may be configured to emit light with a luminance level corresponding to a drive voltage received from the data driver circuitry (212).

In one or more embodiments, the high-side power source terminal and the low-side power source terminals are configured to receive a high-side power source voltage ELVDD (214) and a low-side power source voltage ELVSS (216) from a power management integrated circuit (PMIC) (220), respectively. The high-side power source voltage ELVDD (214) may be delivered to the respective pixel circuits (204) from the high-side power source terminal via high-side power source lines; and the low-side power source voltage ELVSS (216) may be delivered to the respective pixel circuits (204) from the low-side power source via low-side power source lines.

Figure 3:
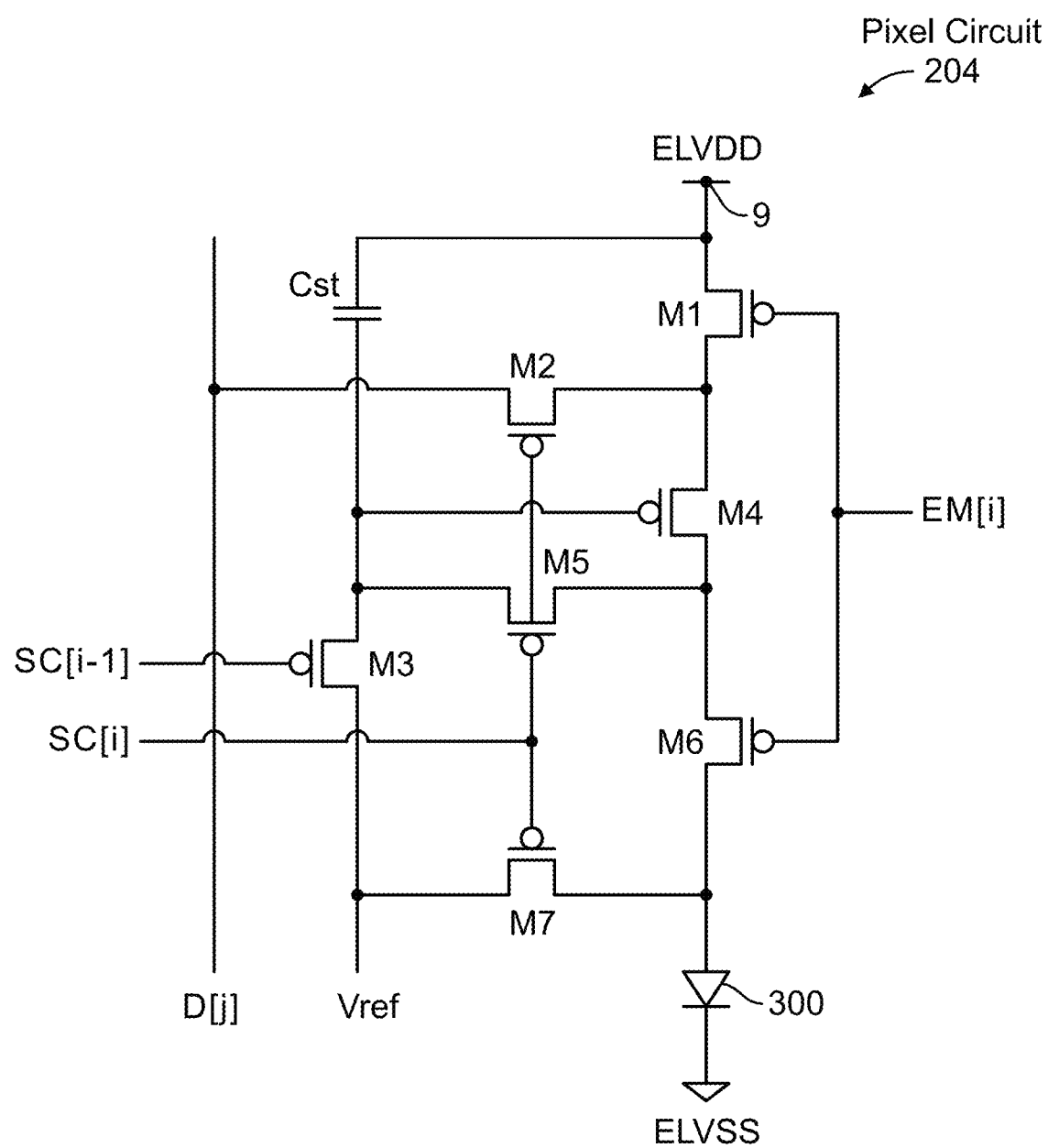
FIG. 3 shows an example circuit diagram of a pixel in accordance with one or more embodiments.

FIG. 3 shows a schematic diagram of a pixel circuit (204) according to one or more embodiments. In FIG. 3, the pixel circuit (204) includes emission control transistors M1, M6, select transistors M2, M3, M5, M7, a drive transistor M4, a storage capacitor Cst, and a light emitting element (300). The transistors M1 to M7 may be configured as positive-channel metal oxide semiconductor (PMOS) transistors. The light emitting element (300) may be an LED, OLED, or other light emitting elements suitable for the type of display panel. The emission control transistor M1, the drive transistor M4, the emission control transistor M6, and the light emitting element (300) are connected in series between a high-side power source configured to supply a high-side power source voltage ELVDD and a low-side power source configured to supply a low-side power source voltage ELVSS.

The emission control transistors M1 and M6 have commonly connected gates that receive the emission scan signal EM[i]. The drive transistor M4 has a gate connected to a storage node (e.g., a storage capacitor) Cst. The select transistor M2 has a gate that receives the scan signal SC[i], a source that receives the source signal D(j), and a drain connected to the source of the drive transistor M4. The select transistor M3 has a gate that receives the scan signal SC[i−1], a source connected to the storage capacitor Cst, and a drain that is arranged to connect between the initializing voltage Vref and the storage capacitor Cst. The initializing voltage may have a fixed voltage level. The select transistor M5 is arranged to be connected between the drain of the drive transistor M4 and the storage capacitor Cst. The select transistor M5 has a gate that receives the scan signal SC[i]. The select transistor M7 has a gate that receives the scan signal SC[i], a source that receives the initializing voltage Vref, and a drain arranged to be connected to the drain of the emission control transistor M6. The storage capacitor Cst is arranged to be connected to the high-side power source and receives the high-side power source voltage ELVDD. The pixel circuit (204) is configured to emit light with a luminance level corresponding to the voltage across the storage capacitor Cst.

Light emission from the pixel circuit (204) is controlled by the emission scan signal EM[i]. When the emission scan signal EM[i] is asserted, the emission control transistors M1 and M6 are turned on, and this generates a drive current through the light emitting element (300). The level of the drive current depends on the gate-source voltage of the drive transistor M4, that is, the voltage across the storage capacitor Cst.

Updating of the pixel circuit (204) includes an initialization phase and a programming phase. The initialization phase involves applying the initializing voltage Vref to the storage capacitor Cst. Applying the voltage is achieved by asserting the scan signal SC[i−1]. When the scan signal SC[i−1] is asserted, the select transistor M3 is turned on and the initializing voltage Vref is supplied to the storage capacitor Cst via the select transistor M3.

The programming phase involves applying the source signal D(j) to the storage capacitor Cst. Applying the source signal D(j) to the storage capacitor Cst is achieved by not asserting the emission scan signal EM[i] and asserting the scan signal SC[i]. When the scan signal SC[i] is asserted, the select transistors M2 and M5 are turned on to supply the source signal D(j) to the storage capacitor Cst via the select transistor M2, the drive transistor M4, and the select transistor M5. When the scan signal SC[i] is asserted, the select transistor M7 is also turned on and the drain of the emission control transistor M6 is reset to the initialization phase. During the programming phase, the source signal D(j) goes through the drive transistor M4 allowing compensation of manufacturing variations of the drive transistor M4. The manufacturing variations may include a variation in the threshold voltage and/or a variation in the channel mobility.

Although FIG. 3 shows an example configuration of a pixel circuit, other configurations may be used without departing from the scope of the claims. The pixel circuit (300) may be configured differently than that shown in FIG. 3. For example, the pixel circuit (204) may be configured as a 5T2C circuit (consisting of five thin film transistors (TFTs)) and two capacitors or a 6T1C circuit (consisting of six TFTs and one capacitor).

Returning to FIG. 2, in one or more embodiments, the scan driver circuitry (210) is configured to drive the scan lines SC [1] to SC [N] and the emission lines EM [1] to EM [N] to select a row of pixel circuits (204) for which a write operation is performed. The scan driver circuitry (210) may be configured to, in a write operation for pixel circuits (204) located in the i-th row, for example, by not asserting the emission line EM [i] and asserting the scan line SC [i]. The scan driver circuitry (210) may be configured to drive the scan lines SC [1] to SC [N] based on scan control signals received from the display driver (208). The scan driver circuitry (210) may be a combination of a gate scan driver and an emission scan driver. The gate scan driver may be configured to drive the scan lines SC [1] to SC [N] and the emission scan driver may be configured to drive the emission lines EM [1] to EM [N]. The scan lines may be referred to as a gate scan lines or gate lines.

In one or more embodiments, the scan control signals include an emission control signal. In such embodiments, the scan driver circuitry (210) may be further configured to control, based on the emission control signal EM_ctrl, light emission from rows of pixel circuits (204) for which the write operation is not being performed. The emission control signal EM_ctrl may control the display brightness level of the display.

The display driver (208) is configured to drive the display panel (206) based on input image data Din and control data Dctrl received from the host (202) to display an image corresponding to the input image data Din on the display panel (206). The input image data Din may include display data that describes grayscale values of the respective colors of each display pixel of the display panel (206). When driving the display panel (206), the display driver (208) includes functionality to compensate for the brightness artifact from LHB period using a compensation circuit. The location(s) of the compensation circuit is dependent on the type(s) of compensation. For example, optional locations are shown using dashed lines in FIG. 2.

The display driver (208) may include interface circuitry (222), image processing circuitry (224), grayscale voltage generator circuitry (226), data driver circuitry (212), power circuit (234), panel interface (I/F) circuitry (230), reference voltage (Vref) circuit (236), and control circuitry (232).

In one or more embodiments, the interface circuitry (222) is configured to receive the input image data Din and the control data Dctrl from the host (202). The interface circuitry (222) may be further configured to forward the input image data Din and control data Dctrl to the image processing circuitry (224) and control circuitry (232). In other embodiments, the interface circuitry (222) may be configured to process the input image data Din and send the processed input image data Din to the image processing circuitry (224).

In one or more embodiments, the image processing circuitry (224) is configured to generate output voltages based on the image to be displayed. The image processing circuitry (224) includes a gamma control circuit (238) and compensation circuit D (240). The gamma control circuit (238) generates gamma voltage control data by performing image processing on the input image data received from the interface circuitry (222). The gamma voltage control data describe voltage values that specify voltage levels of drive voltages to be written into the respective pixel circuits (204) of each pixel of the display panel (206). The gamma voltage control data may not be the voltage level of the pixel circuit, but rather specifies the voltage level.

The gamma control circuit (238) may be controlled by control parameters received from the control circuitry (232) (described below). In embodiments where the display brightness level of the display depends on the correlation between the input image data and the gamma voltage control data, the display brightness level of the display may be controlled by controlling the image processing with the control parameters.

In one or more embodiments, the gamma voltage control data from the gamma control circuit (238) may be input to a compensation circuit D (240). The compensation circuit D (240) is configured to adjust the gamma voltage control data based on the projected brightness artifact to create revised gamma voltage control data. By adjusting the gamma voltage control data, the revised gamma voltage control data accounts for the brightness artifact of the row after the LHB period. Compensation circuit D (240) is described in reference to FIG. 5 after the description of FIG. 2.

Continuing with FIG. 2, the grayscale voltage generator circuitry (226) is configured to supply [m+1] grayscale voltages V0 to Vm to the data driver circuitry (212). In various embodiments, the [m+1] grayscale voltages V0 to Vm have different voltage levels from each other.

In embodiments where grayscale voltage V0 is the highest grayscale voltage and grayscale voltage Vm is the lowest grayscale voltage, the intermediate grayscale voltages V1 to V[m−1] may be generated through voltage dividing of the grayscale voltages V0 and Vm. Display brightness level of the display may depend on a range of the drive voltages supplied to the pixel circuits (204). The range may have an upper limit of grayscale voltage V0 and lower limit of grayscale voltage Vm. The voltage level of the grayscale voltage V0 may be specified by a V0 command value V0* supplied from the control circuitry (232), and the voltage level of the grayscale voltage Vm may be specified by a Vm command value Vm*. In such embodiments, the display brightness level of the display can be controlled by controlling the V0 command value V0* and the Vm command value Vm*.

In one or more embodiments, the data driver circuitry (212) is configured to output, based on the gamma voltage control data from image processing circuitry (224) and grayscale voltage V0-Vm, drive voltages to be written into the respective pixel circuits (204) of the respective pixels of the display panel. The data driver circuitry (212) may be configured to select a drive voltage to be written into each pixel circuit (204) from among the grayscale voltages V0 to Vm based on the voltage value of the gamma voltage control data associated with each pixel circuit (204). In one or more embodiments, the drive voltage to be written into each pixel circuit (204) ranges from Vm to V0 and increases as the voltage value of the gamma voltage control data increases.

In one or more embodiments, the panel interface (I/F) circuitry (230) is configured to generate scan control signals to control the scan driver circuitry (210) of the display panel (206). The scan control signal may include the above-mentioned emission control signal and a gate control signal. The panel interface circuitry (230) may generate scan control signals based on a gate clock width from the control circuitry (232) and output from the power circuit (234).

The Vref circuit (236) is configured to generate a Vref signal (218). As described above, the Vref signal is used to initialize the pixel circuit. The Vref circuit (236) is configured to generate the Vref signal (218) using output from the control circuitry (232).

The control circuitry (232) may be further configured to control the high-side power source voltage ELVDD (214) and the low-side power source voltage ELVSS (216) by supplying a PMIC control signal PMIC_ctrl to the PMIC (220). In such embodiments, the PMIC (220) may be configured to control the low-side power source voltage ELVSS (216) based on an ELVSS command value ELVSS* received from the control circuitry (232). In one or more embodiments, the low-side power source voltage ELVSS (216) is set lower than the lowest grayscale voltage Vm.

In one or more embodiments, the control circuitry (232) is configured to control the various components of the display driver based on the control data received from the host (202). In various embodiments, the control data includes a display brightness value (DBV), and the control circuitry (232) is configured to control the display brightness level of the display based on the DBV received from the interface circuitry (222). As described above, the location of the compensation circuit is dependent on the type of compensation. Thus, compensation circuits are shown in optional locations in FIG. 2. The DBV may be used as input to the compensation circuit at the various optional locations to further adjust the compensation amount.

In embodiments where the display brightness level of the display depends on the output of the grayscale voltage generator circuitry (226), and the emission control value, the grayscale voltage generator circuitry (226) is configured to generate the output based, directly or indirectly, on the DBV. The control circuitry (232) may be further configured to generate the ELVSS command value to the PMIC (220) based on the DBV so that the low-side power source voltage ELVSS (216) is lower than the grayscale voltage.

The control circuitry (232) may be configured to send control signals based on input control signals and a DBV. One or more of the control signals may be revised by a compensation circuit (e.g., compensation circuit A (246), compensation circuit B (252), compensation circuit C (258)). The optional compensated control signals include a gate clock width to the panel interface circuitry (230), a voltage setting to the power circuit (234), and a voltage setting to a Vref circuit (236).

A gate timing circuit (244) is configured to generate a gate clock width value for one or more gate clocks based on input from a register (242). The gate clock width controls the gate clock signal that is transmitted from the panel interface circuitry (230) to the scan driver circuitry (210). In turn, the scan driver circuitry (210) drives the scan lines SC[i] to SC[N] according to the gate clock signal. Specifically, the gate clock signal includes a period of being asserted and a period of not being asserted. Each time the gate clock signal is asserted, the scan driver circuitry (210) asserts one or more scan lines for the initialization phase or programming phase depending on the function of the scan line with respect to the corresponding pixel circuit. For example, as shown in FIG. 3, scan lines SC[i] to SC[i−1] each have different functions with respect to triggering the initialization phase or programming phase for the pixel circuit (204). In adjacent pixel circuits, the scan lines have different corresponding functions.

Figure 4:
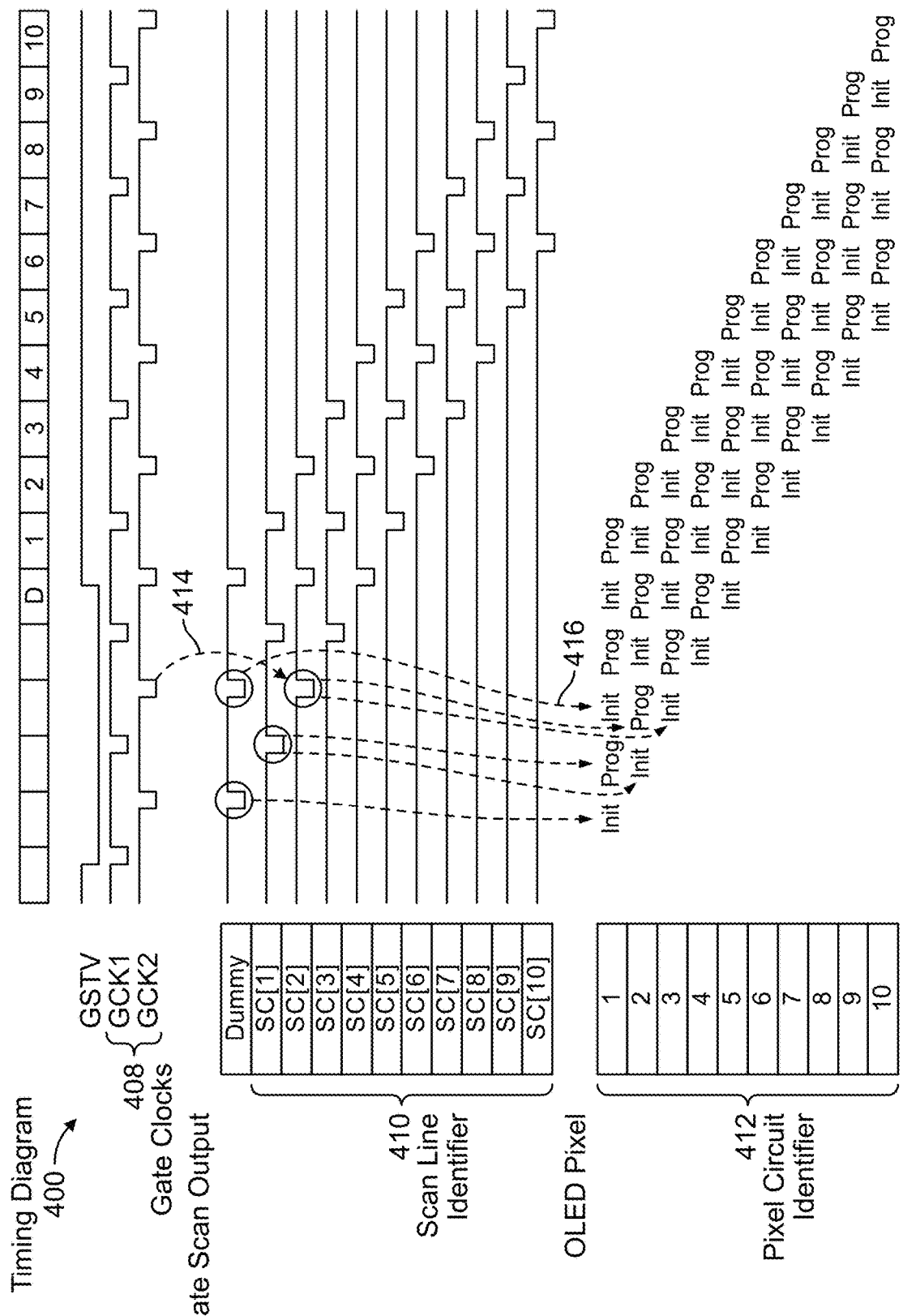
FIG. 4 shows an example timing diagram in accordance with one or more embodiments.

Turning briefly to FIG. 4, an example timing diagram (400) of the gate clock signal is shown. FIG. 4 is for example purposes only and does not show an LHB period. Rather, FIG. 4 demonstrates the relationship between the gate clocks (408), the scan lines, and the pixel circuit phase (i.e., phase of the pixel circuit as described with reference to FIG. 3 above). Scan lines SC[1] to SC[N] are referenced by scan line identifiers (410) and pixel circuits are referenced by pixel circuit identifiers (412) in FIG. 4. As shown in FIG. 4, the two gate clocks (e.g., GCK1 and GCK2) (408) are shown. The gate clock signal on the gate clock is asserted causing the scan driver to assert the corresponding scan lines. As shown in the timing diagram (400), the assertion of the scan lines controls the initialization phase Init or the programming phase Prog shown by lines (416). The gate clock width is the length of time in which the one or more gate clocks are asserted. Transversely, the gate clock width defines the length of time of the scan lines being asserted, and correspondingly, the length of time that the pixel circuit is in a phase.

Returning to FIG. 2, the gate timing circuit (244) sets the gate clock width value using a corresponding register (242). One technique of compensation is to change the gate clock width for the LHB period. Compensation circuit A (246) compensates for the brightness artifact by adjusting the gate clock width. For example, compensation circuit A (246) may specify a gate clock width that increases the period by which the gate clocks are asserted.

Continuing with the control circuitry (232), the power control circuit (250) is configured to generate a gate scan voltage setting using a corresponding register (248). The power control circuit (250) provides the voltage setting to the power circuit (234), which provides value to the panel interface circuitry (230). Specifically, the power control circuit (250) defines the high voltage level and low voltage level of the gate clock(s) in the gate scan voltage setting. One technique for compensation is to adjust the gate scan voltage setting. Specifically, stopping gate clock driving from the display driver due to the LHB period, gate scan voltage level may decrease due to leakage, such as in case of using dynamic circuit in panel. To compensate decreased voltage level, the gate clock voltage level may be changed temporally. In one embodiment, the voltage level of the gate clock signal may be adjusted to compensate for the leakage. Compensation circuit B (252) may be configured to adjust the gate scan voltage level(s) specified in the gate scan voltage setting.

The Vref control circuit (256) is configured to generate a Vref voltage setting based on the register (254). The Vref voltage setting is supplied to the Vref circuit (236). The Vref circuit (236) provides the Vref voltage (218) to the display panel (206), which uses the Vref voltage to initialize the pixel circuit (204). A technique for compensation of the LHB period is to adjust the Vref voltage setting. Compensation circuit C (258) may be configured to adjust the Vref voltage setting and provide the compensated Vref voltage setting to the Vref circuit (236).

As presented in FIG. 2, various techniques can be used for compensating brightness artifact due to the LHB period. Each compensation technique has a corresponding display data that the compensation circuit uses to perform the adjustment. Display data is any parameter used by the display driver (208) to display an image on a display. For example, in the techniques shown in FIG. 2, the display data may include one or more of the following: the gamma voltage, the gate clock width, the gate scan voltage setting, LHB length, and the Vref voltage setting. Notably, the type of display data used as input to determine a compensation amount may be different than the type of display data adjusted with the compensation amount to create revised display data. Embodiments are not limited to the particular display data unless expressly claimed.

Figure 5:
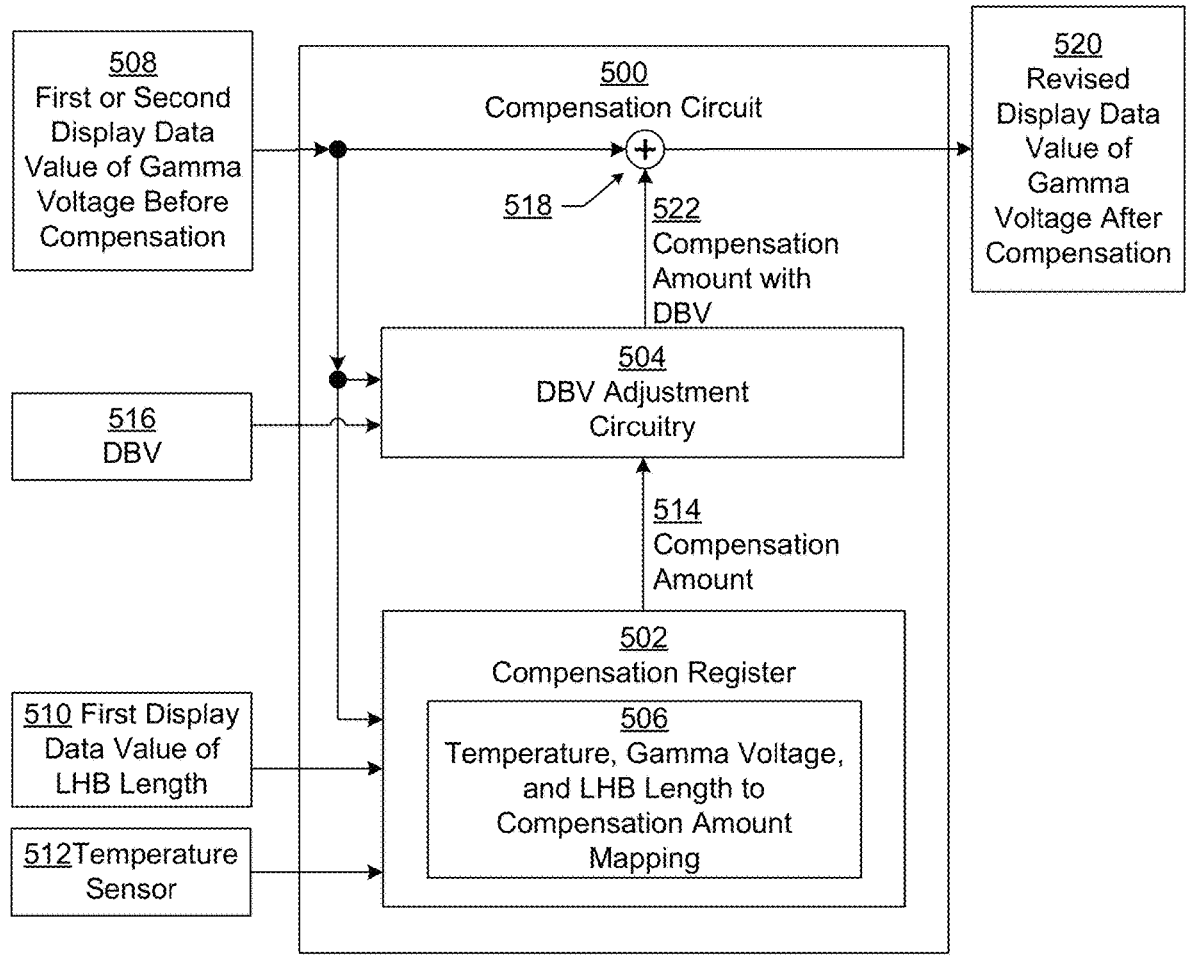
FIG. 5 shows an example compensation circuit diagram in accordance with one or more embodiments.
Figure 6:
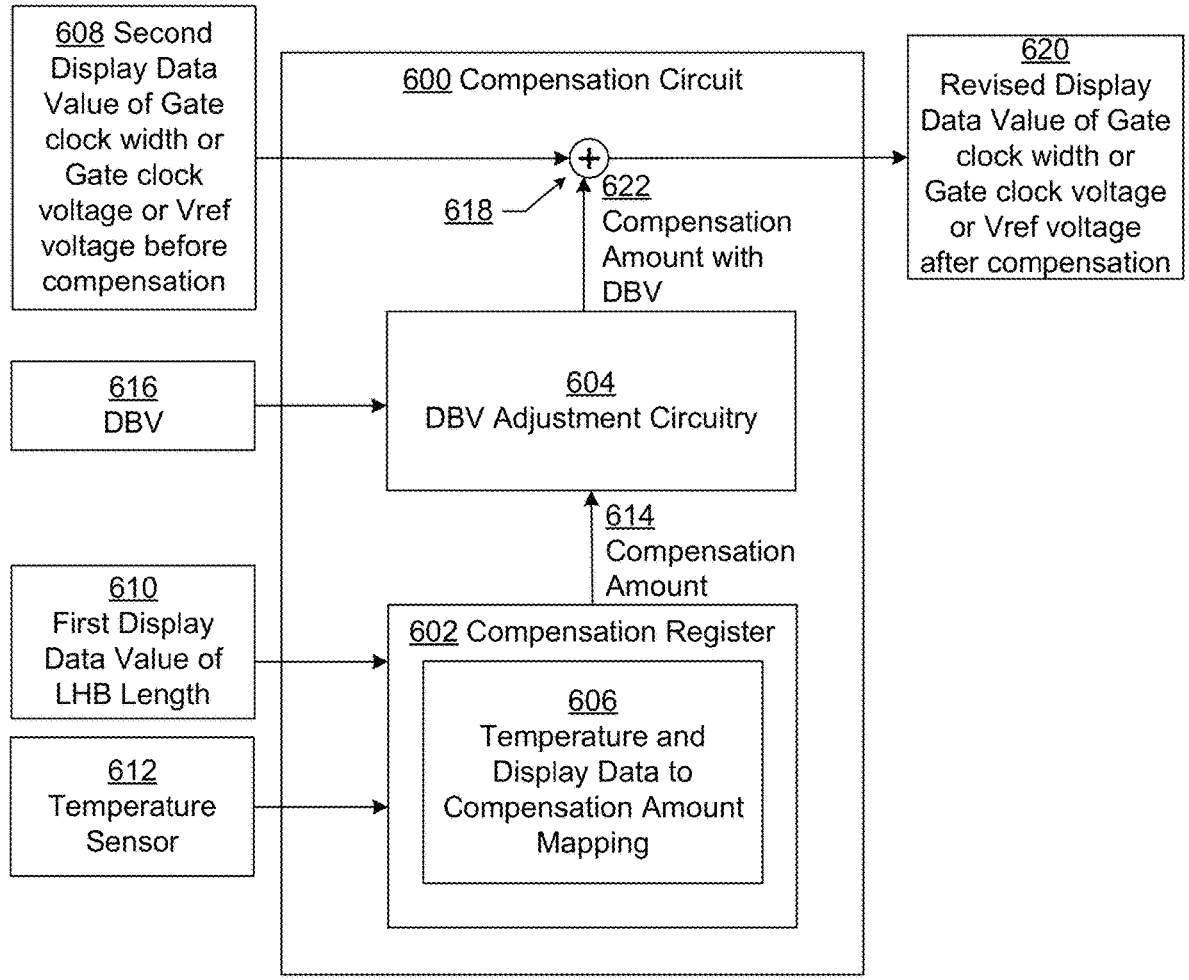
FIG. 6 shows an example compensation circuit diagram in accordance with one or more embodiments.

FIG. 5 and FIG. 6 show example schematic diagrams of compensation circuits in accordance with one or more embodiments. The compensation circuit shown in FIG. 5 is configured to adjust display data when the display data is a gamma voltage.

Turning to FIG. 5, as shown in FIG. 5, the compensation circuit (500) includes a compensation register (502), and a DBV adjustment circuitry (504). The compensation register (502) may include a temperature, gamma voltage, LHB length, and/or other parameters to compensation amount mapping (506). A combination of these parameters may be mapped to a compensation amount. For example, the temperature of the display panel, the gamma voltage, and LHB length are mapped to a compensation amount. The mapping is further described below with reference to FIG. 7. In one or more embodiments, the combination is a tuple having a temperature value, a gamma voltage value, and an LHB length value. In embodiments, the mapping may be a table in the compensation register (502). The compensation register may store the compensation amounts in any of a variety of formats, such as a look up table, one or more individual mappings, a mathematical function, or other type of storage structure.

In the embodiment shown, the compensation register (502) receives first or second display data value of a gamma voltage before compensation (508), first display data value of an LHB length (510), and a temperature sensor value from a temperature sensor (512). The LHB length (510) represents the length of time of the LHB period. The temperature sensor value represents the temperature of the display panel. The compensation register (502) outputs a compensation amount (514). The compensation amount (514) is used as input to the DBV adjustment circuitry (504).

The DBV adjustment circuitry (504) receives the compensation amount (514) as input and applies a DBV (516) to the compensation amount (514). The DBV may be provided by the host processor as a register value. For an LCD, the backlight brightness is controlled according to DBV, and compensation amount (514) is independent from backlight brightness. In such configuration, the compensation amount (514) may not be adjusted with the DBV. In an OLED display, the emission band scans from top of the display panel to the bottom of the display panel each frame as performed by the scan driver. The emission band appears as a black band that is unrecognizable to the human eye except to appear dimmer. For example, if the black band scan is performed at a 60 Hz frame rate, the human eye can't recognize each black band. However, the human eye can recognize brightness change that depends on the black band width. Namely, the wider the band, the darker the display. In an OLED display, the emission band width may be controlled according to DBV, and the final compensation amount (514) may depend on DBV defining the emission band width. By further adjusting the compensation amount by the DBV, the revised display data would be the correct level of brightness according to the host defined brightness level of the display.

The output of the DBV adjustment circuitry (522) is adjusted at element (518) with the first or second display data value of gamma voltage before compensation (508). The output of the adjustment at element (518) is revised display data value (520). In FIG. 5, the revised display data value is gamma voltage after compensation. Thus, for the rows after the LHB period, an adjusted gamma voltage value is used that compensates for the brightness artifact of the LHB period. FIG. 5 shows an example of a compensation circuit D in the image processing circuitry of FIG. 2.

FIG. 6 shows an example compensation circuit diagram for the compensation circuits in the control circuitry in accordance with one or more embodiments. The compensation circuit (600) includes a compensation register (602), and a DBV adjustment circuitry (604). The compensation register (602) includes a temperature and display data to compensation amount mapping (606). Thus, temperature of the display panel and display data combined are mapped to a compensation amount (514). The mapping may be a table in the compensation register (602). The compensation register may store the compensation amounts in any of a variety of formats, such as a look up table, one or more individual mappings, a mathematical function, or other type of storage structure. In the embodiments of FIG. 6, the first display data value is the LHB length (610). The compensation register (602) receives an LHB length (610) and a temperature sensor value from a temperature sensor (612). In one or more embodiments, the compensation amount (614) in FIG. 6 is independent of the gamma voltage. The compensation register (602) outputs a compensation amount (614) which may be used as input to the adjustment with the DBV circuitry (604).

The DBV adjustment circuitry (604) receives the compensation amount (614) as input and applies a DBV (616) to the compensation amount (614). By further adjusting the compensation amount by the DBV, the revised display data would be the correct level of brightness according to the host defined brightness level of the display.

The output of the DBV adjustment circuitry (622) is adjusted at element (618) with a second display data value (608) to generate output. Depending on the compensation circuit, the second display data value may be the gate clock width, gate clock voltage, or Vref voltage before compensation. The output of the adjustment at element (618) is revised a display data value (620). In FIG. 6, the revised display data value is the gate clock width, gate clock voltage, or Vref voltage after compensation.

FIG. 7 shows an example flowchart for creating mappings in a compensation register in accordance with one or more embodiments. In one or more embodiments, the operations of FIG. 7 are performed for the particular type of touchscreen by the device designer or manufacturer rather than the end user. For example, the creation of the mappings may be through experimentation, whereby the mappings in the compensation register are dependent on the particular version of touchscreen. Further, the selection of the one or more compensation circuits to use may be dependent on the type of touchscreen and may be performed by the device designer or manufacturer.

In Step 701, the display panel is tested, under a set of temperature values and display data values, to identify compensation amount(s). For example, in a lab, the display panel may be driven under a variety of conditions, each condition having a set of display data values and a corresponding temperature value. For each condition, the experimentation determines the correct compensation amount for a corresponding set of display data values and temperature value, thereby forming a mapping. The LHB length may be set according to any requirements for the proximity sensing. The correct compensation amount for a particular set of display data values and temperature value is the compensation amount that optimally counteracts the brightness artifact. More specifically, the correct compensation amount is the compensation amount that causes the display to appear as if no LHB period existed.

In Step 703, after performing the mappings, the mappings are stored in the compensation register. The touchscreens may be manufactured with the mappings stored in the compensation register. Examples of stored mappings are described below with reference to FIG. 9, FIG. 10, FIG. 15.1 and FIG. 16.1.

FIG. 8 shows a flowchart for using the compensation circuit in accordance with one or more embodiments. For example, the steps of FIG. 8 may be performed by the touchscreen while an end user is using the device, or by a device tester. In Step 801, a long horizontal blank period is used for a proximity sensing frame. The touchscreen halts the display frame in the LHB period according to the LHB length. During the LHB period, a proximity component in the touchscreen generates a proximity sensing frame using a set of sensor electrodes. The proximity sensing frame may include force detection information as well as proximity detection information. When the proximity sensing frame is completed, the LHB period ends and display updating resumes.

In Step 803, a first display data value is obtained for a row after the LHB period. The type of first display data value is dependent on the type of compensation circuit.

In Step 805, the compensation amount is determined based on the first display data value. As discussed with reference to FIG. 5 and FIG. 6, the first display data value and the temperature value are used as input to the compensation register. The compensation register outputs the compensation amount that is mapped to the first display data value and the corresponding temperature value. The compensation amount may be further adjusted with the DBV.

In Step 807, the second display data value is adjusted with the compensation amount to obtain a revised display data value. The adjustment may be a combination, such as a mathematical combination of increasing or decreasing the second display data value by the compensation amount.

In Step 809, the compensation register outputs, for the display panel the revised display data value. The output is transmitted as a signal to the next component in the display driver, whereby the next component is dependent on the location of the compensation circuit, as described above with reference to FIG. 2.

Figure 9:
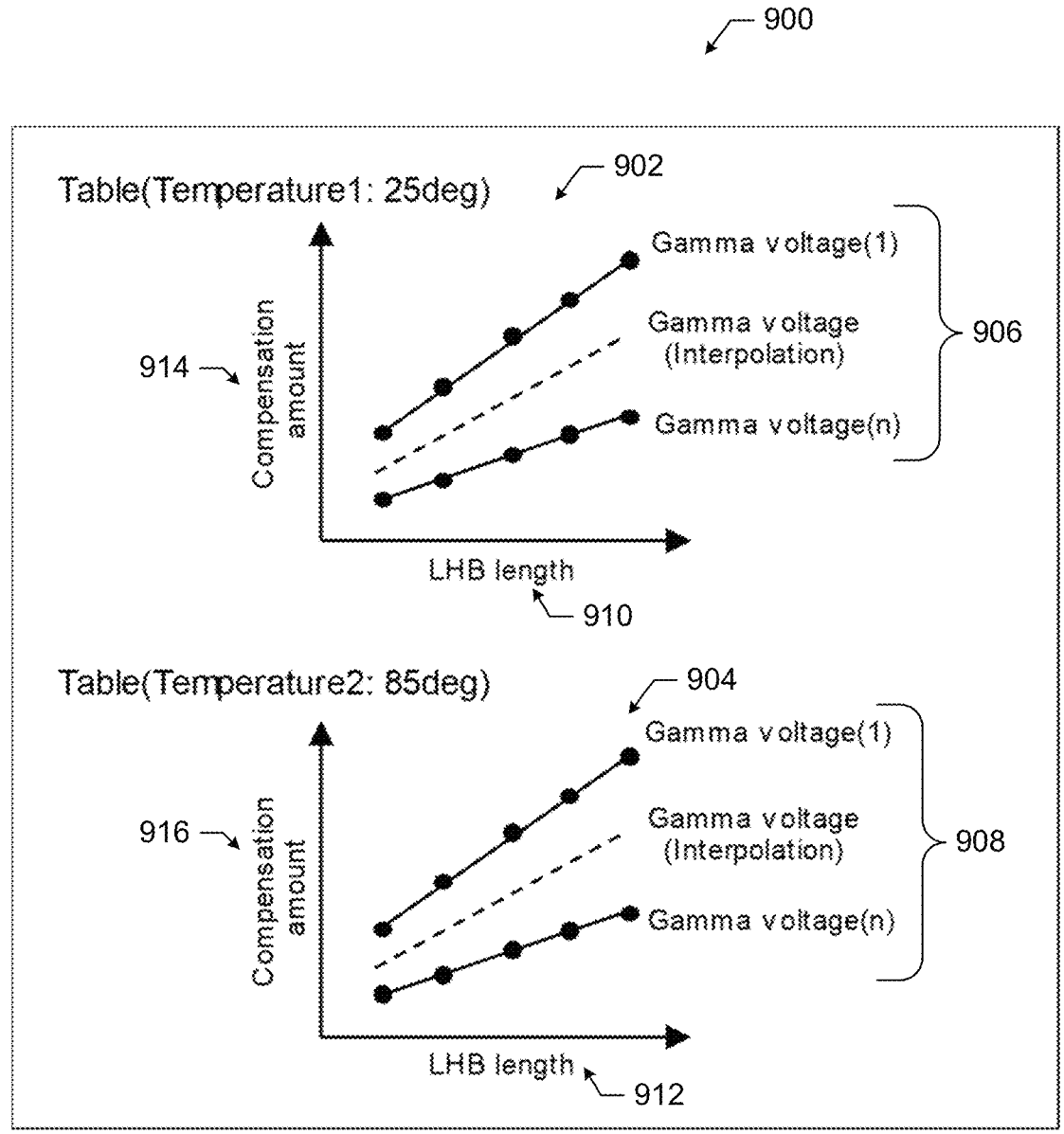
FIG. 9 shows example mappings for the compensation circuit in accordance with one or more embodiments.

FIG. 9 shows example mappings for the compensation circuit in accordance with one or more embodiments. Specifically, FIG. 9 illustrates an example mapping (900) in the compensation register for the gamma voltage compensation in accordance with one or more embodiments. As shown in FIG. 9, each of multiple temperature values may have a corresponding table (902, 904) in the compensation register. For each corresponding temperature, the corresponding table may have separate mappings for each gamma voltage level as shown by graph lines (906, 908). Each gamma voltage level maps an LHB length as shown on the horizontal axis (910, 912) of the table to the corresponding compensation amount as shown on the vertical axis (914, 916) of the table. Thus, the combination of temperature value, gamma voltage value, and LHB value map to a corresponding compensation amount.

Figure 10:
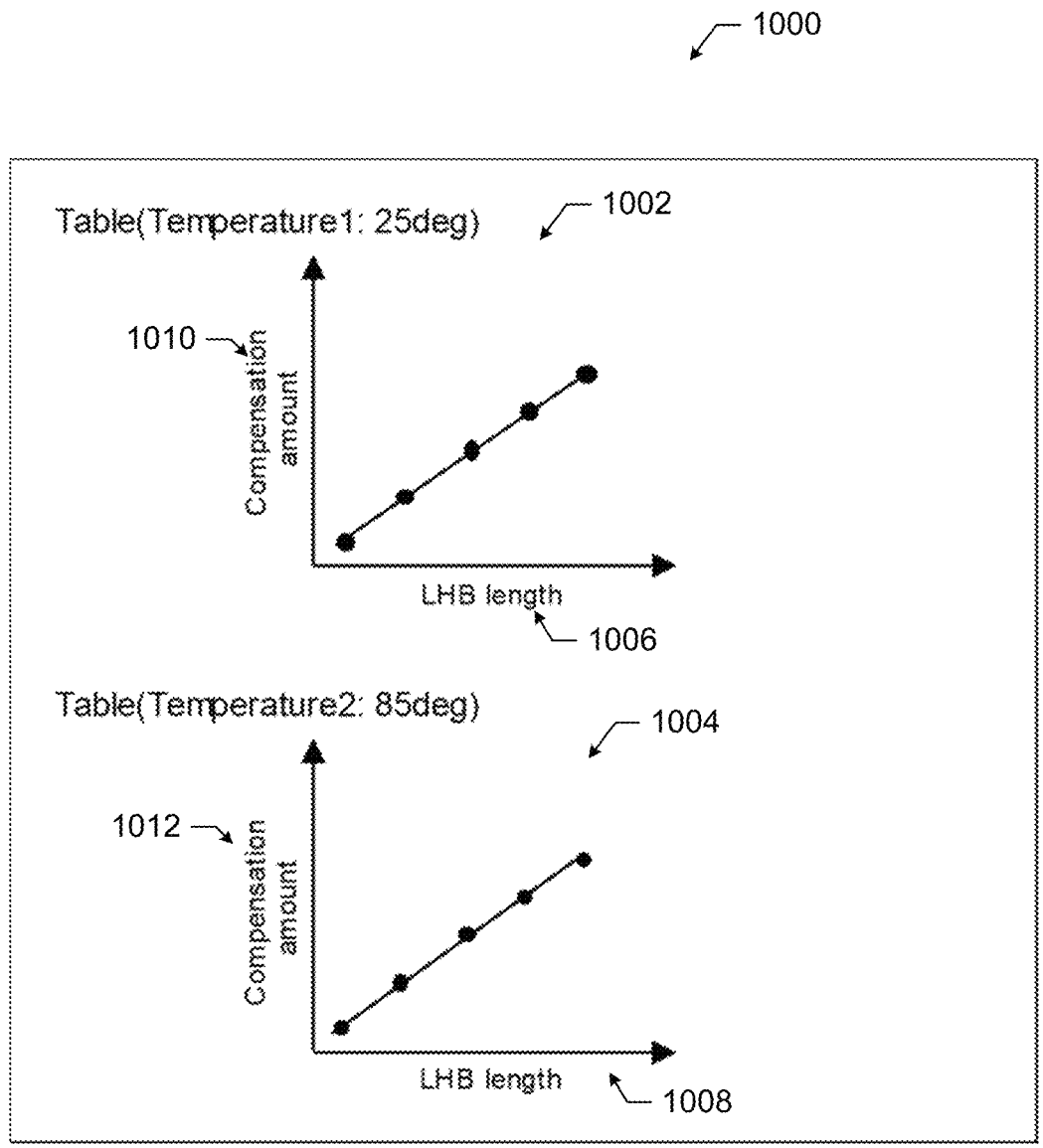
FIG. 10 shows example mappings for the compensation circuit in accordance with one or more embodiments.

FIG. 10 shows example mappings for the compensation circuit in accordance with one or more embodiments. Specifically, FIG. 10 illustrates an example mapping (1000) in the compensation register for the compensation circuit of FIG. 6 in the control circuitry. As shown in FIG. 10, each of multiple temperature values may have a corresponding table (1002, 1004) in the compensation register. Each table maps an LHB length as shown on the horizontal axis (1006, 1008) of the table to the corresponding compensation amount as shown on the vertical axis (1010, 1012) of the table. Thus, the combination of temperature value and LHB value map to a corresponding compensation amount.

Although FIG. 9 and FIG. 10 shows the usage of separate mappings, a single function may be used. Thus, the compensation circuitry may be configured to apply a mathematical function to determine the compensation amount.

Figure 11:
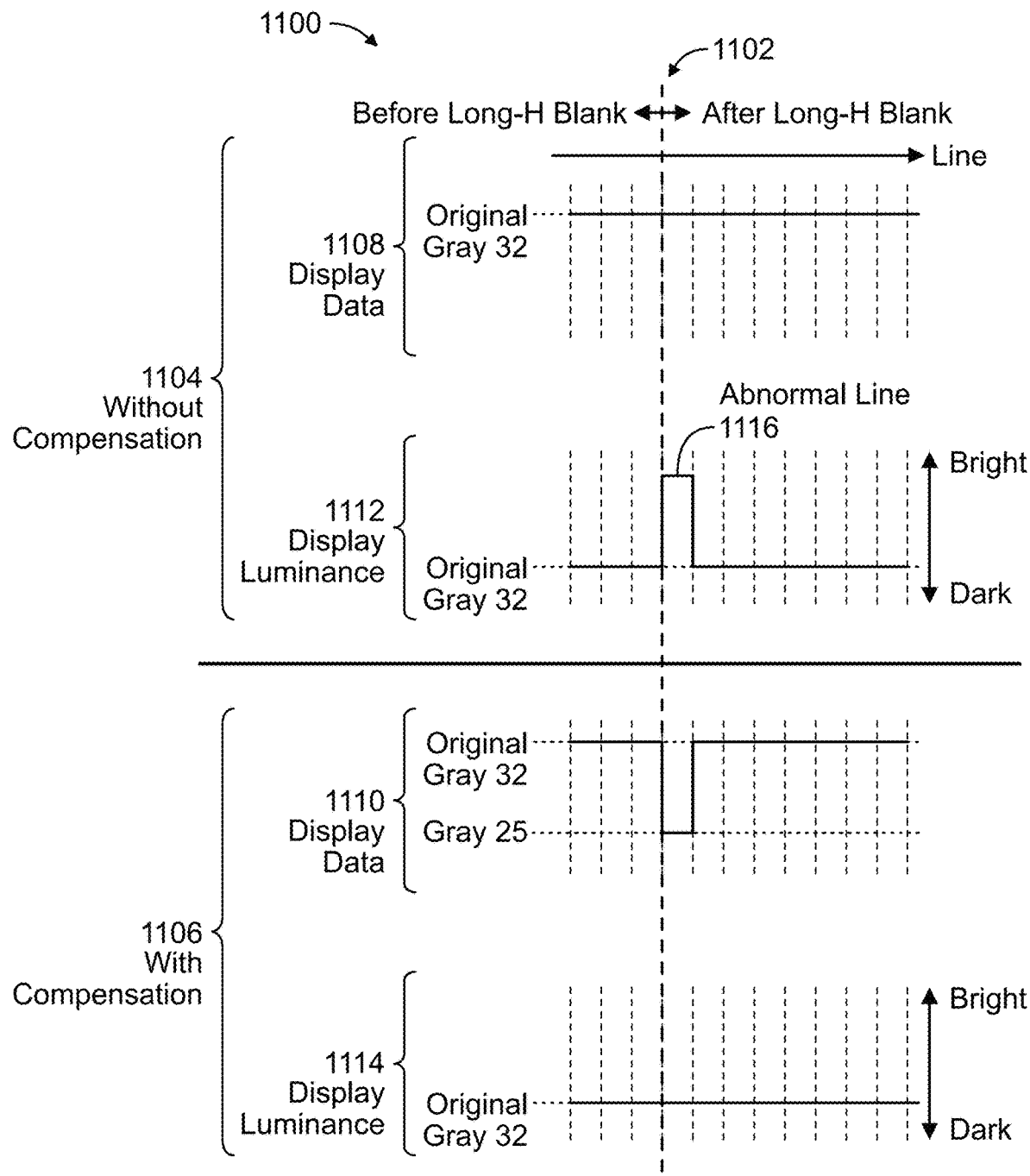
FIG. 11 shows an example diagram for compensating for brightness artifact in accordance with one or more embodiments.

FIG. 11 shows an example timing diagram (1100) of brightness artifact in accordance with one or more embodiments. In the example, line (1102) represents the LHB period. The top portion of the example (1100) is an example of the display if no compensation is performed (i.e., without compensation (1104)) while the bottom portion of the example is an example of the display when compensation is performed (1106). Display data is the display data values (1108, 1110) and the display luminance (1112, 1114) is the output luminance of the display (i.e., how the pixels appear to the user). As shown in the example (1100), without compensation (1104) (i.e., the display data (1108) does not change because of the LHB period (1102)), the display luminance (1112) shows an abnormal line (1116). The abnormal bright line may be a horizontal row of the display after the LHB period (1102).

As shown in example (1100), with compensation (1106) (i.e., the display data (1110) does change because of the LHB period (1102)), the display luminance (1114) is the same luminance and remains unchanged regardless of the LHB period.

FIG. 12 shows an example timing diagram for compensating for brightness artifact in accordance with one or more embodiments. Specifically, FIG. 12 shows an example (1200) for compensating using gate clock width in accordance with one or more embodiments. In FIG. 12, the timing is partitioned into a first display period (1202), a proximity period (1204), and a second display period (1206). The first and second display periods (1202, 1206) correspond to a single display frame. The proximity period (1204) corresponds to an LHB period. The timing diagrams are for the gate clock 1 (1208) and gate clock 2 (1210). Gate clock 1 (1208) and gate clock 2 (1210) are two gate clocks (e.g., GCK1, GCK2, respectively) that may be used to control the pixel circuit as described above with reference to FIG. 4. As shown in FIG. 12, a compensation amount (1212) is added to the gate clock width of gate clock 1 (1208) to compensate for the LHB period. As shown, the compensation amount (1212) temporarily increases the gate clock width.

FIG. 13 shows an example timing diagram for compensating for brightness artifact in accordance with one or more embodiments. Specifically, FIG. 13 shows an example (1300) for compensating using gate clock voltage in accordance with one or more embodiments. In FIG. 13, the timing is partitioned into a first display period (1302), a proximity period (1304), and a second display period (1306). The first and second display periods (1302, 1306) correspond to a single display frame. The proximity period (1304) corresponds to an LHB period. The timing diagrams are for the gate clock 1 (1308) and gate clock 2 (1310). Gate clock 1 (1208) and gate clock 2 (1210) are two gate clocks (e.g., GCK1, GCK2, respectively) that may be used to control the pixel circuit as described above with reference to FIG. 4. As shown in FIG. 13, a compensation amount (1313) is added to the gate clock voltage of gate clock 1 (1308) to compensate for the LHB period. As shown, the compensation amount temporarily increases the gate clock voltage.

Figure 14:
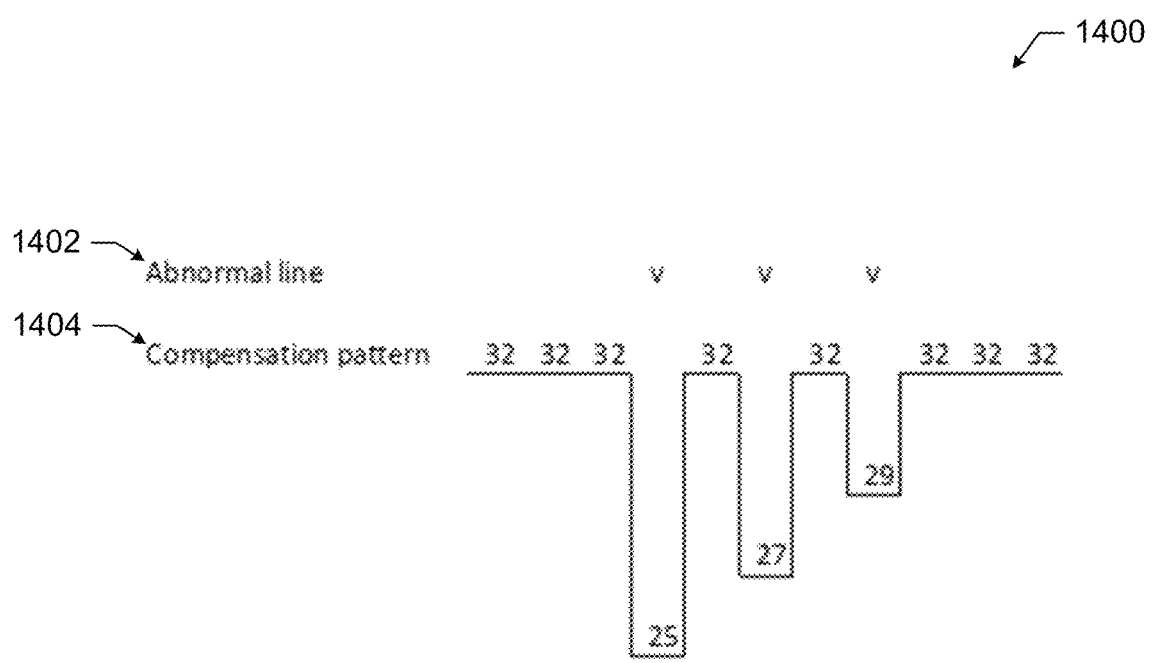
FIG. 14 shows an example compensation pattern in accordance with one or more embodiments.

FIG. 14 shows an example compensation pattern in accordance with one or more embodiments. Specifically, FIG. 14 shows an example timing diagram (1400) of a portion of a display frame. The first row (1402) shows the portions of the display frame having abnormal lines (i.e., one or more rows of the display) (labeled with a "v" in FIG. 14). The second row (1404) shows an example compensation pattern (1404) for the same portions of the display frame. In the second row (1404), the line and numbers correspond to compensation amounts. The rows are aligned in that the abnormal lines occur at the same time as vertically adjacent compensation amount. As shown in the example, for different abnormal lines, the compensation amount may be different. In other words, the compensation amounts may vary between rows.

The variance in compensation amounts may result from temperature and LHB length variation or independent of temperature and/or LHB length.

FIG. 15.1 shows an example compensation register in accordance with one or more embodiments. In the example, the compensation register is shown as a table (1500). Each row in the table (1500) relates a register name to a register value (1502) with a compensation amount (1504) that is a function based on temperature and pixel data value. The rows of the table (1500) may correspond to rows of the pixel circuits. In the table (1500), the temperature is denoted by the variable C. In the example as in one or more embodiments, the LHB length is statically defined for an LHB period. By being statically defined, the LHB length for a particular LHB period does not change between different display frames. Thus, the compensation amount (1504) may be just a function of temperature. Having a compensation amount (1504) being just a function of temperature increases the speed of the compensation circuit.

FIG. 15.2 shows an example display (1550) corresponding to the example compensation register of FIG. 15.1 in accordance with one or more embodiments. Specifically, FIG. 15.2 shows the difference between the display before compensation (1552) and the display after compensation (1554). As shown by the brighter line after the LHB period, the display before compensation (1552) has the brightness artifact after LHB period 1156 while the display after compensation (1554) does not exhibit brightness artifact.

FIG. 16.1 and FIG. 16.2 show an example with multiple LHB periods. In the example, the compensation register is shown as a table (1600). Each row in the table (1600) relates a register name to a register value (1602) with a compensation amount (1604) that is a function based on temperature. The rows of the table (1600) may correspond to rows of the pixel circuits. In the table (1600), the temperature is denoted by the variable C. Similar to the compensation register of FIG. 15.1, the compensation amount (1604) is a function of temperature. However, because of variation, different rows have different register values and correspondingly compensation functions leading to different compensation amounts.

FIG. 16.2 shows an example display (1650) corresponding to the example compensation register of FIG. 16.1 in accordance with one or more embodiments of the invention. Specifically, FIG. 16.2 shows the difference between the display before compensation (1652) and the display after compensation (1654). As shown by the brighter lines after the LHB periods (1666), the display before compensation (1652) has the brightness artifact while the display after compensation (1654) does not exhibit brightness artifact. The amount of the brightness artifact, and correspondingly, the compensation amount varies between rows.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:
1. A compensation circuit comprising:
 a compensation register storing a mapping between display data and compensation amounts; and
 circuitry configured for:
  determining a compensation amount from the compensation register using a gamma voltage value for a display row after a long horizontal blank (LHB) period in a display frame of a display panel,
adjusting the gamma voltage value with the compensation amount to obtain a revised display data value,
wherein adjusting the gamma voltage value with the compensation amount decreases the gamma voltage value to generate the revised display data value, and
outputting, for the display panel, the revised display data value.

2. The compensation circuit of claim 1, wherein the circuitry is further configured for obtaining a temperature value from a temperature sensor, and determining the compensation amount using the temperature value.

3. The compensation circuit of claim 1, wherein the compensation register stores an individual corresponding mapping for each of a plurality of display rows, the plurality of display rows each after a corresponding long horizontal blank period, wherein the circuitry is further configured for:
selecting the individual corresponding mapping for the display row to obtain the compensation amount.

4. The compensation circuit of claim 1, wherein the LHB period changes locations between display frames to obtain changing locations, and wherein the compensation circuit is configured to adjust the gamma voltage value for at least one display row corresponding to the changing locations.

5. A compensation circuit comprising:
a compensation register storing a mapping between display data and compensation amounts; and
circuitry configured for:
determining a compensation amount from the compensation register using a first display data value for a display row after a long horizontal blank (LHB) period in a display frame of a display panel,
adjusting the compensation amount from the compensation register with a display brightness value (DBV) to obtain an adjusted compensation amount,
adjusting a second display data value with the adjusted compensation amount to obtain a revised display data value, and
outputting, for the display panel, the revised display data value.

6. The compensation circuit of claim 5, wherein the first display data value is a LHB length of the LHB period.

7. The compensation circuit of claim 5,
wherein the second display data value is at least one selected from a group consisting of a gate clock width, a reference voltage, and gate scan voltage level, and
wherein adjusting the second display data value with the compensation amount increases the second display data value to generate the revised display data value.

8. The compensation circuit of claim 5,
wherein adjusting the second display data value with the compensation amount increases the second display data value to generate the revised display data value.

9. A compensation circuit comprising:
a compensation register storing a mapping between display data and compensation amounts; and
circuitry configured for:
determining a compensation amount from the compensation register using a first display data value for a display row after a long horizontal blank (LHB) period in a display frame of a display panel,
adjusting a gray level with the compensation amount to obtain a revised display data value,
outputting, for the display panel, the revised display data value.

10. A display driver comprising:
image processing circuitry comprising a gamma control circuit and a compensation circuit,
the gamma control circuit configured to output, to the compensation circuit, a gamma voltage value,
the compensation circuit configured to:
determine, using the gamma voltage value, a compensation amount from a mapping between display data and compensation amounts, the gamma voltage value being for a display row after a long horizontal blank (LHB) period in a display frame of a display panel, and
adjust the gamma voltage value with the compensation amount to obtain a revised display data value,
wherein adjusting the gamma voltage value with the compensation amount decreases the gamma voltage value to generate the revised display data value, and
output, for the display panel, the revised display data value.

11. The display driver of claim 10, further comprising:
a temperature sensor coupled to the compensation circuit, the temperature sensor configured to output a temperature value of the display panel,
wherein the compensation circuit is further configured to:
determine the compensation amount further using the temperature value.

12. A display driver comprising:
interface circuitry electrically coupled to a compensation circuit, the interface circuitry configured to output a display brightness value (DBV) to a compensation circuit; and
the compensation circuit configured to:
determine, using a first display data value, a compensation amount from a mapping between display data and compensation amounts, the first display data value being for a display row after a long horizontal blank (LHB) period in a display frame of a display panel,
adjust the compensation amount from the mapping with the DBV to obtain an adjusted compensation amount,
adjust a second display data value with the adjusted compensation amount to obtain a revised display data value, and
output, for the display panel, the revised display data value.

13. The display driver of claim 12, wherein the first display data value is an LHB length of the long horizontal blank period.

14. The display driver of claim 12, further comprising:
control circuitry comprising a gate timing circuit configured to output, to the compensation circuit, a gate clock width,
wherein the second display data value is the gate clock width, and
wherein adjusting the second display data value with the compensation amount increases the gate clock width to generate the revised display data value, and
a panel I/F circuitry configured to receive the revised display data value from the compensation circuit and provide output to a scan driver driving the display panel.

15. The display driver of claim 12,
control circuitry comprising a power control circuit configured to output, to the compensation circuit, a gate scan voltage level, wherein the second display data value is the gate scan voltage level, and wherein adjusting the second display data value with the compensation amount increases the gate scan voltage level to generate the revised display data value, a power circuit configured to receive the revised display data value.

16. The display driver of claim 12, further comprising:

an individual corresponding mapping for each of a plurality of display rows, the plurality of display rows each after a corresponding long horizontal blank period, wherein the compensation circuit is further configured to:

select the individual corresponding mapping for the display row to obtain the compensation amount.

17. The display driver of claim 12, wherein adjusting the second display data value with the compensation amount increases the second display data value to generate the revised display data value.

18. A display driver comprising:

control circuitry comprising a reference voltage (Vref) control circuit configured to output, to a compensation circuit, a reference voltage, the compensation circuit configured to:

determine, using a first display data value, a compensation amount from a mapping between display data and compensation amounts, the first display data value being for a display row after a long horizontal blank (LHB) period in a display frame of a display panel, adjust the reference voltage with the compensation amount to obtain a revised display data value, wherein adjusting the reference voltage with the compensation amount increases the reference voltage to generate the revised display data value, and output, for the display panel, the revised display data value; and a Vref circuit configured to receive the revised display data value.

19. A method comprising:

determining, using a first display data value, a compensation amount from a mapping between display data and compensation amounts, the first display data value being for a display row after a long horizontal blank period in a display frame of a display panel;

adjusting the compensation amount with a display brightness value (DBV) to obtain an adjusted compensation amount;

adjusting a second display data value with the adjusted compensation amount to obtain a revised display data value; and outputting, for the display panel, the revised display data value.

20. The method of claim 19, wherein adjusting the second display data value with the compensation amount increases the second display data value to generate the revised display data value.

* * * * *

UNITED STATES PATENT AND TRADEMARK OFFICE
CERTIFICATE OF CORRECTION

PATENT NO. : 11,195,493 B2  
APPLICATION NO. : 16/871979  
DATED : December 7, 2021  
INVENTOR(S) : Kazuhiro Okamura et al.

It is certified that error appears in the above-identified patent and that said Letters Patent is hereby corrected as shown below:

In the Claims

Claim 14, at Column 18, Line number 60, "I/F" should be deleted.

Signed and Sealed this  
Twenty-second Day of February, 2022

Drew Hirshfeld  
*Performing the Functions and Duties of the*  
*Under Secretary of Commerce for Intellectual Property and*  
*Director of the United States Patent and Trademark Office*